United States Patent
Buck, Jr. et al.

(10) Patent No.: US 10,097,952 B2
(45) Date of Patent: Oct. 9, 2018

(54) SYSTEMS AND METHODS FOR MONITORING ALTITUDE SENSING BEACONS

(71) Applicant: BI Incorporated, Boulder, CO (US)

(72) Inventors: James J. Buck, Jr., Longmont, CO (US); Cady Lyn Brooks, Nederland, CO (US); Joseph P. Newell, Louisville, CO (US); Richard Wallace Miller, Jr., Longmont, CO (US)

(73) Assignee: BI Incorporated, Boulder, CO (US)

( * ) Notice: Subject to any disclaimer, the term of this patent is extended or adjusted under 35 U.S.C. 154(b) by 0 days.

(21) Appl. No.: 15/159,966

(22) Filed: May 20, 2016

(65) Prior Publication Data

US 2017/0339519 A1    Nov. 23, 2017

(51) Int. Cl.
   H04W 24/00    (2009.01)
   H04W 4/021    (2018.01)
   H04W 64/00    (2009.01)
   H04W 84/12    (2009.01)
   H04W 88/12    (2009.01)

(52) U.S. Cl.
   CPC .......... H04W 4/021 (2013.01); H04W 64/00 (2013.01); H04W 84/12 (2013.01); H04W 88/12 (2013.01)

(58) Field of Classification Search
   CPC ....... H04W 64/00; H04W 4/02; H04W 4/021; H04W 88/12; H04W 84/12; H04L 29/08657; H04M 1/72519; G08B 27/006; G08B 21/18

USPC .............. 455/456.1, 457, 550.1, 456.5; 342/357.31, 439.13
See application file for complete search history.

(56) References Cited

U.S. PATENT DOCUMENTS

| | | | |
|---|---|---|---|
| 7,930,927 B2 | 4/2011 | Cooper et al. | |
| 8,493,219 B2 | 7/2013 | Buck et al. | |
| 8,576,065 B2 | 11/2013 | Buck et al. | |
| 8,629,776 B2 | 1/2014 | Buck et al. | |
| 8,657,744 B2 | 2/2014 | Rompa et al. | |
| 9,240,118 B2 | 1/2016 | Melton | |
| 9,241,659 B2 | 1/2016 | Rompa et al. | |
| 2007/0140270 A1* | 6/2007 | Hulkkonen | H04L 12/185 370/401 |
| 2008/0280624 A1* | 11/2008 | Wrappe | G01S 1/68 455/456.1 |
| 2011/0148699 A1* | 6/2011 | Anderson | G01S 19/34 342/357.31 |
| 2011/0154887 A1 | 6/2011 | Cooper et al. | |
| 2012/0271491 A1* | 10/2012 | Spata | G01W 1/00 701/3 |
| 2013/0006066 A1 | 1/2013 | Melton | |
| 2013/0324154 A1* | 12/2013 | Raghupathy | G01S 19/10 455/456.1 |
| 2014/0062693 A1* | 3/2014 | Watts | G08B 27/006 340/539.11 |

(Continued)

OTHER PUBLICATIONS

U.S. Appl. No. 13/919,862, filed Jun. 17, 2013, Newell et al.

(Continued)

Primary Examiner — Danh Le
(74) Attorney, Agent, or Firm — Hamilton, DeSanctis & Cha

(57) ABSTRACT

Various embodiments of the present inventions are related to monitoring physical location of a monitored target, but not limited to, use of beacon location information.

22 Claims, 8 Drawing Sheets

(56) References Cited

U.S. PATENT DOCUMENTS

| | | | |
|---|---|---|---|
| 2014/0266707 A1* | 9/2014 | Melton | G08B 21/22 |
| | | | 340/539.13 |
| 2014/0355476 A1* | 12/2014 | Anderson | H04W 24/02 |
| | | | 370/254 |
| 2015/0048948 A1 | 2/2015 | Buck et al. | |
| 2015/0061864 A1 | 3/2015 | Buck et al. | |
| 2015/0078622 A1 | 3/2015 | Buck et al. | |
| 2015/0131085 A1 | 5/2015 | Cooper et al. | |
| 2015/0228184 A1 | 8/2015 | Buck et al. | |
| 2015/0279200 A1 | 10/2015 | Buck et al. | |
| 2015/0327214 A1 | 11/2015 | Buck et al. | |
| 2016/0124069 A1* | 5/2016 | Sendonaris | G01S 5/0226 |
| | | | 342/462 |
| 2016/0291589 A1* | 10/2016 | Ashoori | G01S 19/13 |
| 2017/0006417 A1* | 1/2017 | Canoy | H04L 63/126 |
| 2017/0171719 A1* | 6/2017 | Igarashi | H04W 4/043 |

OTHER PUBLICATIONS

U.S. Appl. No. 14/966,135, filed Dec. 11, 2015, Donald A. Melton.
U.S. Appl. No. 15/059,914, filed Mar. 3, 2016, Buck, et al.

* cited by examiner

SYSTEMS AND METHODS FOR
MONITORING ALTITUDE SENSING
BEACONS

BACKGROUND OF THE INVENTION

The present invention is related to monitoring systems, and in particular to ensuring the integrity of location information relied upon in a monitoring system.

Large numbers of individuals are currently housed in prisons. This represents a significant cost to society both in terms of housing expense and wasted productivity. Remote monitoring the location and movement of individuals provides a cost effective alternative to incarceration. In some cases, the monitoring relies on input from fixed location beacons to indicate a location of the monitored individual. Where the integrity of the location information available from the fixed location beacons is undermined, the location information about a monitored individual is also undermined.

Hence, there exists a need in the art for advanced systems and methods for ensuring the integrity of location information derived from a fixed location beacon.

BRIEF SUMMARY OF THE INVENTION

The present invention is related to monitoring systems, and in particular to ensuring the integrity of location information relied upon in a monitoring system.

This summary provides only a general outline of some embodiments of the inventions. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present inventions. Importantly, such phases do not necessarily refer to the same embodiment. Many other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, similar reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1A:
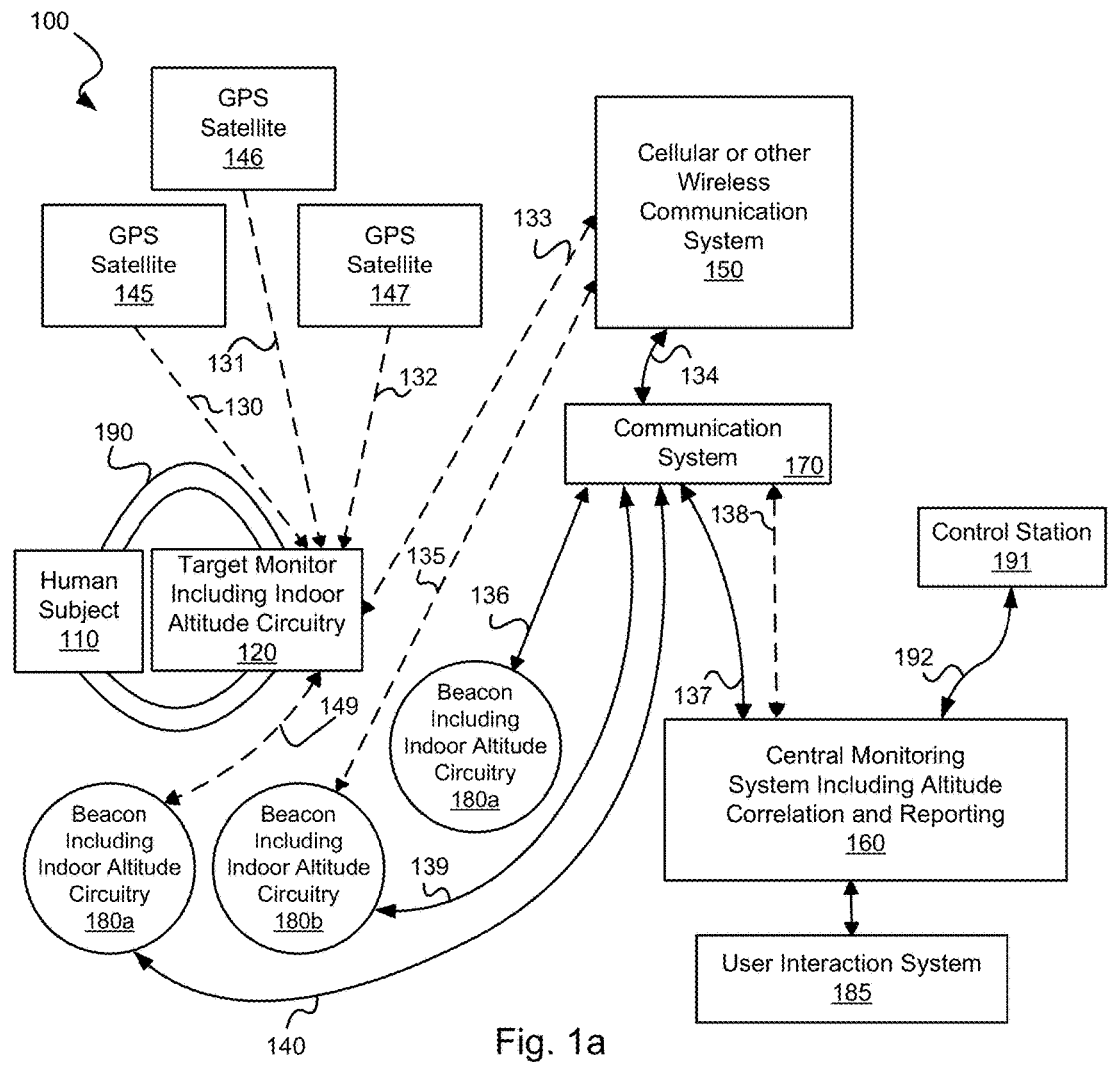
FIGS. 1a-1c depict a tracking and monitoring system including altitude sensing beacons in accordance with various embodiments of the present inventions.

The present invention is related to monitoring systems, and in particular to ensuring the integrity of location information relied upon in a monitoring system.

Various embodiments of the present inventions provide location monitoring systems. The systems include a beacon device and a target monitor. The beacon device includes: an altitude determination circuit operable to determine an altitude value corresponding to an altitude of the beacon device, and a wireless transmitter circuit operable to transmit beacon information including beacon location data derived from the altitude value. The target monitor includes: an attachment apparatus configured to attach the target monitor to a target, a wireless receiver circuit operable to receive the beacon information, and a wireless transmitter circuit operable to transmit an alert level to a recipient device. The alert level is generated based at least in part on the beacon location data. In some instances of the aforementioned embodiments, the target monitor further includes an altitude determination circuit.

In some instances of the aforementioned embodiments, the altitude determination circuit is a barometric pressure sensing circuit, and the altitude value is an indication of a barometric pressure around the beacon device. In one or more instances of the aforementioned embodiments, where the altitude value is a first altitude value corresponding to a first time, the altitude determination circuit is further operable to determine a second altitude value corresponding to an altitude of the beacon device at a second time. In some such instances, the beacon device further includes a controller circuit operable to: compare the first altitude value with the second altitude value and generate an altitude change indication when a difference between the first altitude value and the second altitude value is greater than a threshold value. The altitude change indication is included in the beacon location data, and the alert level is generated based at least in part on the altitude change indication.

In one or more of the aforementioned embodiments, the beacon location data includes the altitude value. In some such instances, the controller circuit is operable to: store the altitude value at a first time as a baseline value in a memory; receive the altitude value at a second time as an updated value; compare the updated value with the baseline value; and generate the alert level based at least in part on the result of the comparison of the updated value with the baseline value. In some cases, the alert level indicates a change in altitude of the beacon device when the magnitude of a difference between the updated value and the baseline value exceeds a threshold value.

In some instances of the aforementioned embodiments, the beacon device further includes a power loss indication circuit operable to generate a power loss indication when the beacon device stops receiving power from a fixed power source and a motion sensing circuit operable to generate a motion indication when the beacon device moves. In some cases where the beacon information further includes the motion indication and the power loss indication, the alert level may be generated based at least in part on a combination of the beacon location data, the motion indication, and the power loss indication. In some such cases, the beacon device further includes a Wi-Fi signature circuit operable to detect a change in Wi-Fi access points visible to the beacon device and to generate a Wi-Fi signature change indication, where the beacon information further includes the Wi-Fi signature change indication. The alert level is generated based at least in part on a combination of the beacon location data, the motion indication, the power loss indication, and the Wi-Fi signature change indication. In other such cases, the target monitor device further includes a Wi-Fi signature circuit operable to detect a change in Wi-Fi access points visible to the target monitor when the target monitor is in range of the beacon device and to generate a Wi-Fi signature change indication. The alert level is generated based at least in part on a combination of the beacon location data, the motion indication, the power loss indication, and the Wi-Fi signature change indication.

Other embodiments of the present inventions provide location monitoring systems that include a beacon device and a target monitor. The beacon device is operable to transmit beacon information. The target monitor device includes: an attachment apparatus configured to attach the target monitor to a target, a wireless receiver circuit operable to receive the beacon information, a Wi-Fi signature circuit operable to detect a change in Wi-Fi access points visible to the target monitor when the target monitor is in range of the beacon device and to generate a Wi-Fi signature change indication; and a wireless transmitter circuit operable to transmit an alert level to a recipient device, wherein the alert level is generated based at least in part on the Wi-Fi signature change indication. In some instances of the aforementioned embodiments, the alert level indicates a likelihood that the beacon was moved from a baseline position.

Yet other embodiments of the present inventions provide beacon devices that include an altitude determination circuit. Such an altitude determination circuit may be, but is not limited to a barometric pressure sensing circuit.

Yet further embodiments of the present inventions provide beacon devices that include: a beacon identification value associated with a physical location of the beacon device; an altitude determination circuit operable to determine an altitude value corresponding to an altitude of the beacon device; and a wireless transmitter circuit operable to transmit the beacon identification value and an altitude data derived from the altitude value. In some instances of the aforementioned embodiments, the altitude determination circuit is a barometric pressure sensing circuit, and wherein the altitude value is an indication of a barometric pressure around the beacon device. In various instances of the aforementioned embodiments, the beacon devices include: a fixed power source connection capable of connection to a fixed power source. In such instances, the physical location of the beacon corresponds to a physical location of the fixed power source. In some such instances, the beacon device further includes a power loss indication circuit operable to generate a power loss indication when the beacon device stops receiving power via the fixed power source connection. In such instances, the wireless transmitter circuit is further operable to transmit the power loss indication.

Turning to FIG. 1a, a tracking and monitoring system 100 including altitude sensing beacons 180a, 180b, 180c is depicted in accordance with various embodiments of the present inventions. Tracking and monitoring system 100 may be tailored for tracking human subjects as is referred in this detailed description. However, it should be noted that various implementations and deployments of tracking and monitoring system 100 may be tailored for tracking other animals or even inanimate objects such as, for example, automobiles, boats, equipment, shipping containers or the like.

Tracking and monitoring system 100 includes, but is not limited to, a target monitor 120 that is physically coupled to a human subject 110 by a securing device 190. In some cases, securing device 190 is a strap that includes a continuity sensor that when broken indicates an error or tamper condition. Further, in some cases, target monitor 120 includes a proximity sensor that is able to detect when it has been moved away from an individual being monitored. When such movement away from the individual is detected, an error or tamper condition may be indicated. Based on the disclosure provided herein, one of ordinary skill in the art will recognize a variety of tamper sensors that may be incorporated in either target monitor 120 or securing device 190 to allow for detection of removal of target monitor 120 or other improper or unexpected meddling with target monitor 120.

Target monitor 120 is designed to provide the location of human subject 110 under a number of conditions. For example, when target monitor 120 is capable of receiving wireless GPS location information 130, 131, 132 from a sufficient number of GPS satellites 145, 146, 147 respectively, target monitor 120 may use the received wireless GPS location information to calculate or otherwise determine the location of human subject 110. As used herein, the acronym "GPS" is not specifically limited to a single global positioning system, but rather is used in its broadest sense to refer to any positioning functionality relying on satellite signaling (i.e., any global navigation satellite system) including, but not limited to, the Global Positioning System, the GLONASS system, the Galileo system or the Beidou system as are known in the art. Alternatively or in addition, the location of an altitude sensing beacon 180 that is local to target monitor 120 may be used as the location of target monitor 120. As more fully discussed herein, use of such a beacon allows for a reasonable approximation of the location of human subject 110 in three dimensional space. The location information for human subject 110 may be generated in locations where GPS location information is not available such as, for example, in the residence or work space of human subject 110. As yet another alternative, an trilateration fix may be established based on cellular communication with target monitor 120. It should be noted that other types of earth based triangulation may be used in accordance with different embodiments of the present inventions. For example, other cell phone based triangulation, Wi-Fi or Bluetooth frequency based triangulation, low power wide area network triangulation based on sub-Gigahertz frequency signals. Based on the disclosure provided herein, one of ordinary skill in the art will recognize other types of earth based triangulation that may be used.

An trilateration fix may be established based on cellular communications between target monitor 120 and a cellular communication system 150. It should be noted that cellular communication system 150 may be replaced by another type of wireless communication system. Furthermore, when wireless communication link 133 between target monitor 120 and cellular communications system 150 is periodically established, at those times, target monitor 120 may report status and other stored records including location fixes to a central monitoring system 160 via wireless communication link 138.

Tracking and monitoring system 100 includes, but is not limited to, at least one altitude sensing beacon 180. Altitude sensing beacons 180 are instrumental for beacon based tracking and monitoring systems. Within FIG. 1a, a telemetric wireless link 149 has been depicted between altitude sensing beacon 180a and target monitor 120. Each altitude sensing beacon 180 has an adjustable range to make telemetric wireless contact with target monitor 120. At any point in time, depending on each beacon's 180 relative distance to target monitor 120, none, one, or more than one altitude sensing beacons 180 may be within transmission range of a single target monitor 120. Likewise, it is further conceivable under various circumstances that more than one target monitor 120 at times be within in range of a solitary altitude sensing beacon 180.

Telemetric wireless communications path 149 established at times between altitude sensing beacon 180a and target monitor 120 illustrates a common feature of various different embodiments of the current inventions. Some embodiments of the current invention vary on how, i.e. protocol, and what information and/or signaling is passed over wireless link 149. For example, in more simplified configurations and embodiments, each altitude sensing beacon 180 is limited to repetitively transmitting its own beacon ID and motion sensor information. In that way, once target monitor 120 is within transmission range of altitude sensing beacon 180a and establishes wireless or wired reception 149, then target monitor 120 can record and store received beacon ID. Altitude sensing beacon 180 includes altitude circuitry capable of generating information indicating a location of the beacon along a z-axis (i.e., where the x and y axis define a plane from which the z-axis extends perpendicularly). This z-axis or altitude information may be occasionally updated using the altitude circuitry and repetitively transmitted such that a target monitor 120 within range of altitude sensing beacon can receive the transmitted altitude information. At a later time, for some embodiments of the present invention, target monitor 120 can then report recorded readings from beacons 180 to the central monitoring system 160 over the cellular communication system 150 using wireless links 133 and 138 as depicted in FIG. 1a. Furthermore, many embodiments allow for such transmissions and information passing to occur without being noticed by human subject 110, and unnoticed, automatically, and near effortlessly central monitoring system 160 is able to establish records and track human subject's 110 movements and whereabouts.

Of note, a particular altitude sensing beacon 180 includes a beacon ID which may be, but is not limited to, a beacon identification number. This beacon identification number is transmitted to a target monitor in proximity of the particular altitude sensing beacon. This identification number may be associated with a known location of the altitude sensing beacon. As tracking and monitoring system 100 relies on the location associated with the beacon ID provided from the altitude sensing beacon 180 to establish the location of target monitor 120, moving the particular altitude sensing beacon away from the known location undermines the integrity of information provided from target monitor 120 to central monitoring system 160. To avoid this, each of altitude sensing beacons 180 are tethered to a fixed location power source that controls a level of motion sensing provided by the tethered beacon. Tethering altitude sensing beacons 180 to a power source may be done, for example, by connecting the altitude sensing beacon to an AC wall outlet, connecting the altitude sensing beacon to a telephone jack, connecting the altitude sensing beacon to a cable jack, or the like. Based upon the disclosure provided herein, one of ordinary skill in the art will recognize a variety of non-movable power sources to which altitude sensing beacons 180 may be connected in accordance with different embodiments of the present inventions.

In some cases, altitude sensing beacons 180 each include a multi-level motion sensing circuit that is operable to determine whether a respective altitude sensing beacon 180 is moving. When a particular altitude sensing beacon 180 is connected to a power source, a low sensitivity motion sensor circuit is employed to determine motion. In contrast, when the particular altitude sensing beacon 180 is not connected to a power source, a high sensitivity motion sensor circuit is employed to determine motion. Thus, when altitude sensing beacon 180 is connected to a power source and is less likely to be the subject of problematic motion (i.e., motion that impacts the integrity of location data transferred from target monitor 120 to central monitoring system 160), the motion sensing employed is less sensitive. As such, the possibility of a false positive (e.g., indicating motion of the altitude sensing beacon caused by loud music playing near the tethered beacon) when the altitude sensing beacon 180 is unlikely to be moving is reduced. In contrast, the possibility of problematic motion is increased when altitude sensing beacon 180 is disconnected from the power source, and in such a scenario the motion detection sensitivity is increased. In some cases, tethered beacons 180 include GPS and/or cellular communication based location circuitry that is turned on when motion is detected to obtain an updated location.

In other embodiments or configurations according to the present invention, each altitude sensing beacon 180 also transmit status information related to its own device health and information related from each beacon's 180 internal tampering, movement, or other sensors via a communication system 170 to central monitoring system 160. This allows for detection of movement of beacons 180, and establishing some level of confidence that the physical location associated with each of beacons 180 is accurate. Alternatively, in yet other embodiments or configurations, all communications between altitude sensing beacons 180 and communication system 170 is done by transferring information from a given altitude sensing beacon 180 to a target monitor 120 within range of the beacon, and the information is then transferred, where appropriate, from the target monitor to communication system 170 via a cellular communication system 150.

In some other embodiments, each target monitor 120 contains a number of tampering, shielding, movement, and/or other sensors related to its own device health. While still further embodiments also include a number of other measurement transducers within target monitor 120 for extracting information, and for later reporting, related to physical properties of human subject 110. For example, measuring for the presence of alcohol and/or other drugs present in human subject 110 may be included in some embodiments of target monitor 120. As one example, the alcohol sensor discussed in U.S. Pat. No. 7,930,927 entitled "Transdermal Portable Alcohol Monitor and Methods for Using Such" and filed by Cooper et al. on Mar. 4, 2008. The entirety of the aforementioned reference is incorporated herein by reference for all purposes.

Altitude sensing beacons 180 in alternative embodiments of the present invention also communicate with central monitoring system 160 independently of target monitor 120.

The tracking and monitoring system 100 illustrated in FIG. 1 shows altitude sensing beacon 180b having both a wireless communication link 135 with cellular communication system 150, and also illustrates altitude sensing beacon 180b having a hardwired communication link 139 with land communication system 170. Tracking and monitoring system 100 is also shown with altitude sensing beacons 180a, 180b, and 180c each having hardwired land communication links 140, 139, and 136 respectively to land communication system 170. Tracking and monitoring system 100 further illustrates land communication system 170 having a hardwired communication link 134 to cellular communication system 150, and a hardwired communication link 137 to central monitoring system 160.

In some embodiments of the present invention, altitude sensing beacons 180 are located in areas frequented by human subject 110 where target monitor 120 is incapable of accessing information from the GPS system, or simply where power used accessing information from a GPS or cellular location system can be saved. Such beacons eliminate the need to perform a non-satellite based fix (e.g., trilateration) and avoid the costs associated with GPS (e.g., power consumption), Wi-Fi or cellular based position fix. As an example, human subject 110 may have an altitude sensing beacon 180 placed within his home, and one also placed at his place of employment in close proximity to his work area. In this way, the two placed beacons, each at different prescribed times, can interact with his attached target monitor 120 to periodically make reports to central monitoring system 160 to track movements and the whereabouts of human subject 110. All this can be done without incurring the costs associated with performing a satellite based fix such as, for example, trilateration.

Figure 1B:
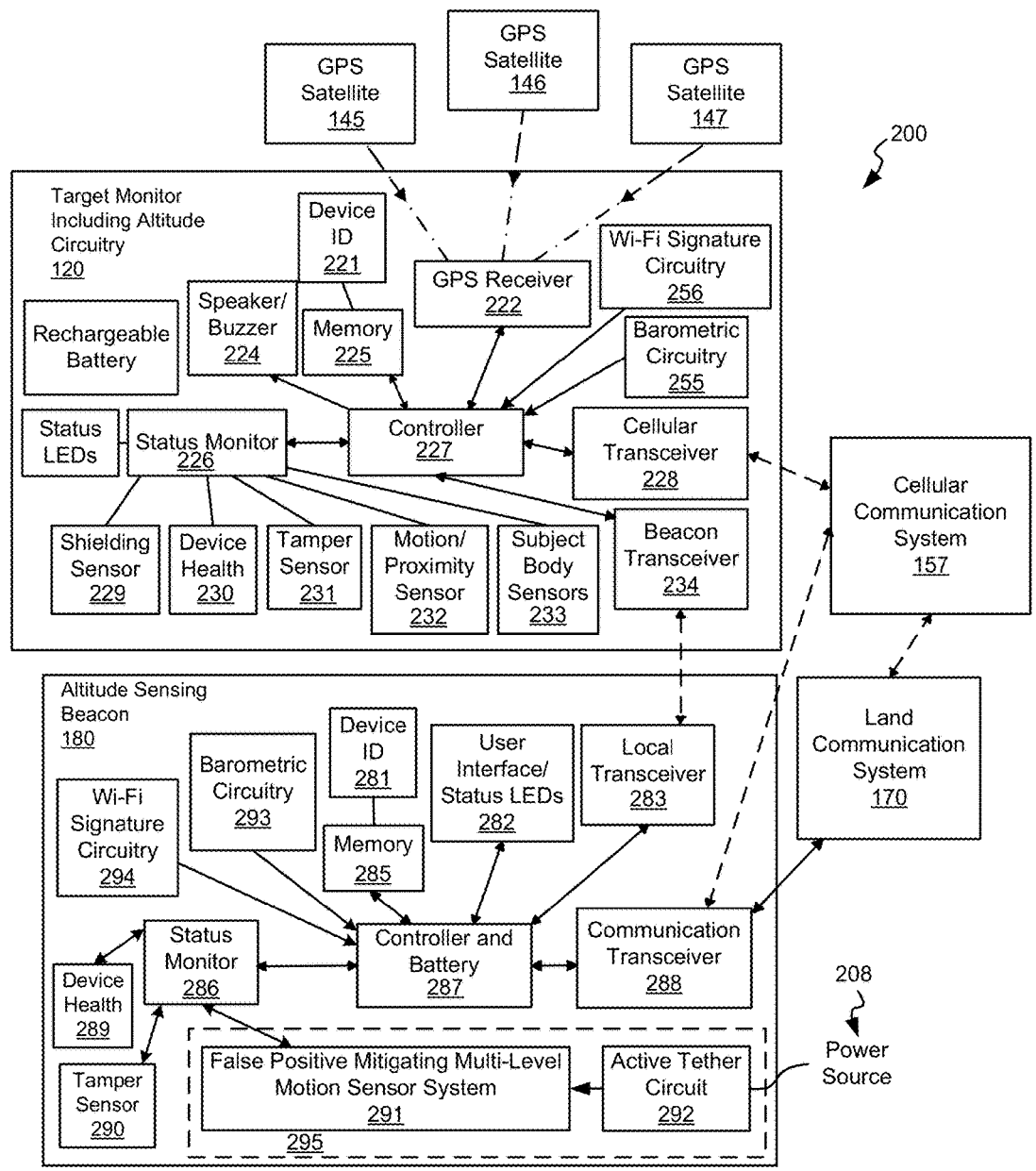

Turning to FIG. 1b, a tracking and monitoring system 200 including a single altitude sensing beacon 280 is depicted in accordance with some embodiments of the present inventions. Tracking and monitoring system 200 is a subset of tracking and monitoring system 100 described above in relation to FIG. 1 with target monitor 120 and altitude sensing beacon 180 being shown in greater detail. As shown in FIG. 1b, tracking and monitoring system 200 includes only a single altitude sensing beacon 180 in communication with a target monitor 120. Target monitor 120 is capable of receiving GPS information from GPS satellites 145, 146, and 147 respectively. A GPS receiver 222 within target monitor device 120 at times is useful for determining physical locations, i.e. whenever GPS receiver 222 is powered-on, and also as long as receiving sufficient GPS satellites signal transmissions.

Tracking and monitoring system 200 illustrates target monitor's 120 device ID 221 being stored in a memory 225, and is thus accessible by a controller 227. Controller 227 is able to interact with GPS receiver 222 and memory 225 at times for storing and generating records of successively determined GPS locations. Controller 227 may be, but is not limited to, a microprocessor, microcontroller or other device known in the art that is capable of executing software or firmware instructions.

Controller 227 of target monitor device 120 at times functions in conjunction with a cellular transceiver 228 to send and receive data and signals through cellular communication system 250. This link at times is useful for passing information and/or control signals between central monitoring system 260 and target monitor device 120. Cellular communication system 250 and cellular transceiver 228 can also at times often be useful for determining a physical location for subject devices 220 through trilateration when requested. It should be noted that the functionality of cellular communication system 250 may be performed by another wireless communication system depending upon the particular embodiment.

Target monitor 120 further includes barometric circuitry 255 that is capable of sensing a barometric pressure around target monitor 120. Barometric circuitry 255 may be any circuitry known in the art that is capable of providing an output value that changes as a function of altitude without using triangulation. In one particular embodiment, barometric circuitry 255 is an MPL115A digital barometric pressure sensor made by Freescale Semiconductor™. Based upon the disclosure provided herein one of ordinary skill in the art will recognize a variety of systems, devices and/or circuits that may be used to implement barometric circuitry 255. The output from barometric circuitry 255 is provided to controller 227.

Target monitor 120 further includes Wi-Fi signature circuitry 256 that is capable of sensing Wi-Fi signals transmitted from one or more Wi-Fi access points within range of target monitor 120. This set of signals is provided to controller 227 as a Wi-Fi signature for target monitor 120. As target monitor 120 moves relative to the Wi-Fi access points, Wi-Fi signature circuitry 256 will sense different Wi-Fi signals transmitted from Wi-Fi access points. Thus, in target monitor 120 it results in a potential change in the recorded Wi-Fi signature.

Tracking and monitoring system 200 depicts controller 227 interacting with a beacon transceiver 234. A status monitor 226 and a speaker/buzzer 224 are all interconnected and interact through controller 227. In alternative embodiments of the present invention, status monitor 226 includes one or more of the following subcomponents: a set of shielding sensors 229 that are capable of determining whether target monitor device 120 is being shielded from receiving GPS signals and/or if GPS jamming is ongoing, a set of device health indicators 230, a tamper sensor 231 capable of determining whether unauthorized access to target monitor device 120 has occurred or whether target monitor device 120 has been removed from an associated human subject, a motion/proximity sensor 232 capable of determining whether target monitor device 120 is moving and/or whether it is within proximity of human subject 110, and/or other body sensors 233 for making physical measurements of human subject 110. Based on the disclosure provided herein, one of ordinary skill in the art will recognize a variety of shielding sensors, a variety of device health transducers and indicators, a variety of tamper sensors, various different types of motion sensors, different proximity to human sensors, and various human body physical measurement sensors or transducers that may be incorporated into target monitor device 120 according to various different instances and/or embodiments of the present inventions.

Altitude sensing beacon 280 includes a local transceiver 283 capable of providing information to target monitor device 120, and in some cases receiving information from target monitor device 120. Communication between beacon transceiver 234 and local transceiver 283 can be either wireless or wired. For example, the communication may be made via Universal Serial Bus protocol over a wired interface. As another non-limiting example, communication between beacon transceiver 234 and local transceiver 283 can be via a wireless Bluetooth™ protocol. Based on the disclosure provided herein, one of ordinary skill in the art will recognize a variety of wireless and wired interfaces and interface protocols that may be used in relation to different embodiments of the present inventions. Altitude sensing beacon 180 further includes a device ID 281 maintained in a memory 285. Device ID 281 uniquely identifies altitude sensing beacon 180, and may in some cases be used to designate an operational difference between beacons (e.g., a beacon used to provide location information to a subject device or a beacon used to find a misplaced or discarded subject device). Altitude sensing beacon 180 may further include a user interface 282 that provides some indication of the operational status of the beacon.

In some instances, altitude sensing beacon 180 includes a communications transceiver 288 that is capable of communication via one or both of a land communication system 270 or cellular communication system 250. Altitude sensing beacon 280 may also include a status monitor 286 that is capable of accessing information from device health sensors 289, tamper sensors 290 and/or a tether based motion sensing system 295. As shown, tether based motion sensing system 295 includes: an active tether circuit 292 that is operable to determine whether altitude sensing beacon 180 is connected to a power source 208; and a false positive mitigating multi-level motion sensor system 291. Based on the disclosure provided herein, one of ordinary skill in the art will recognize a variety of status information that may be monitored to determine whether altitude sensing beacon 180 is properly operational and whether the location information provided from beacon 280 to target monitor device 120 is reliable. The various functional elements of altitude sensing beacon 180 are controlled and powered by a controller and battery 287 that may be, but is not limited to, a combination of a battery and a microprocessor, a microcontroller or other device known in the art that is capable of executing software or firmware instructions.

Of note, a location where altitude sensing beacon 180 is deployed is associated with a beacon ID that is programmed into memory 285. This beacon ID is transmitted to target monitor device 120. As tracking and monitoring system 200 relies on the location associated with the beacon ID provided from altitude sensing beacon 180 to establish its location that is programmed to central monitoring system 160, moving the particular altitude sensing beacon away from the known location undermines the integrity of information provided from target monitor device 120 to central monitoring system 160. To avoid this, altitude sensing beacon 180 is tethered to power source 208. Active tether circuit 292 determines whether altitude sensing beacon 180 is attached to power source 208, or is disconnected from power source 208. Any circuit known in the art for determining whether there is a connection to a power source may be used to implement active tether circuit 292. Active tether circuit 292 provides an output indicating whether altitude sensing beacon 180 is connected to power source 208.

False positive mitigating multi-level motion sensor system 291 is operable to detect motion of altitude sensing beacon 280, and provides an indication of any sensed motion to status monitor 286. The level of sensitivity of the motion sensing performed by false positive mitigating multi-level motion sensor system 291 is dynamically selected bases upon the output from active tether circuit 292 indicating whether altitude sensing beacon 180 is connected to power source 208. When altitude sensing beacon 180 is connected to power source 208, a low sensitivity motion sensor circuit is employed to determine motion. In contrast, when altitude sensing beacon 180 is not connected to power source 208, a high sensitivity motion sensor circuit is employed to determine motion. Thus, when altitude sensing beacon 180 is connected to a power source and is less likely to be the subject of problematic motion (i.e., motion that impacts the integrity of location data transferred from target monitor device 120 to central monitoring system 260), the motion sensing employed is less sensitive. As such, the possibility of a false positive (e.g., indicating motion of the altitude sensing beacon caused by loud music playing near the tethered beacon) when the altitude sensing beacon 180 is unlikely to be moving is reduced. In contrast, the possibility of problematic motion is increased when altitude sensing beacon 180 is disconnected from the power source, and in such a scenario the motion detection sensitivity is increased. In some cases, altitude sensing beacon 180 includes GPS and/or cellular communication based location circuitry that is turned on when motion is detected to obtain an updated location.

Altitude sensing beacon 180 further includes barometric circuitry 293 that is capable of sensing a barometric pressure around altitude sensing beacon 180. Barometric circuitry 293 may be any circuitry known in the art that is capable of providing an output value that changes as a function of altitude without using triangulation. In one particular embodiment, barometric circuitry 293 is an MPL115A digital barometric pressure sensor made by Freescale Semiconductor™. Based upon the disclosure provided herein one of ordinary skill in the art will recognize a variety of systems, devices and/or circuits that may be used to implement barometric circuitry 293. The output from barometric circuitry 293 is provided to controller 287.

Altitude sensing beacon 180 further includes Wi-Fi signature circuitry 294 that is capable of sensing Wi-Fi signals transmitted from one or more Wi-Fi access points within range of altitude sensing beacon 180. This set of signals is provided to controller 227 as a Wi-Fi signature for altitude sensing beacon 180. As altitude sensing beacon 180 moves relative to the Wi-Fi access points, Wi-Fi signature circuitry 294 will sense different Wi-Fi signals transmitted from Wi-Fi access points. Thus, as altitude sensing beacon 180 it results in a potential change in the produced Wi-Fi signature.

Alternatively, the Wi-Fi signature circuitry may be implemented in target monitor 120. In such an embodiment, the Wi-Fi signature circuitry included in target monitor 120 determines a Wi-Fi signature when in range of altitude sensing beacon 180 which becomes a baseline signature. Later when target monitor 120 is again within range of altitude sensing beacon 180, the Wi-Fi signature circuitry included in target monitor 120 re-determines a Wi-Fi signature. This newly determined Wi-Fi signature is compared with the baseline signature to determine if a change has occurred.

Figure 1C:

Turning to FIG. 1c, one implementation 196 of a combination of target monitor 120 and strap 190 is shown in accordance with one or more embodiments of the present inventions. Based upon the disclosure provided herein, one of ordinary skill in the art will recognize a variety of a target monitor that may be used in relation to different embodiments of the present inventions. For example, in another embodiment, the target monitor may be a device that reports a presumed identity of an individual in possession of the device and a location at the device at different times.

Figure 2:
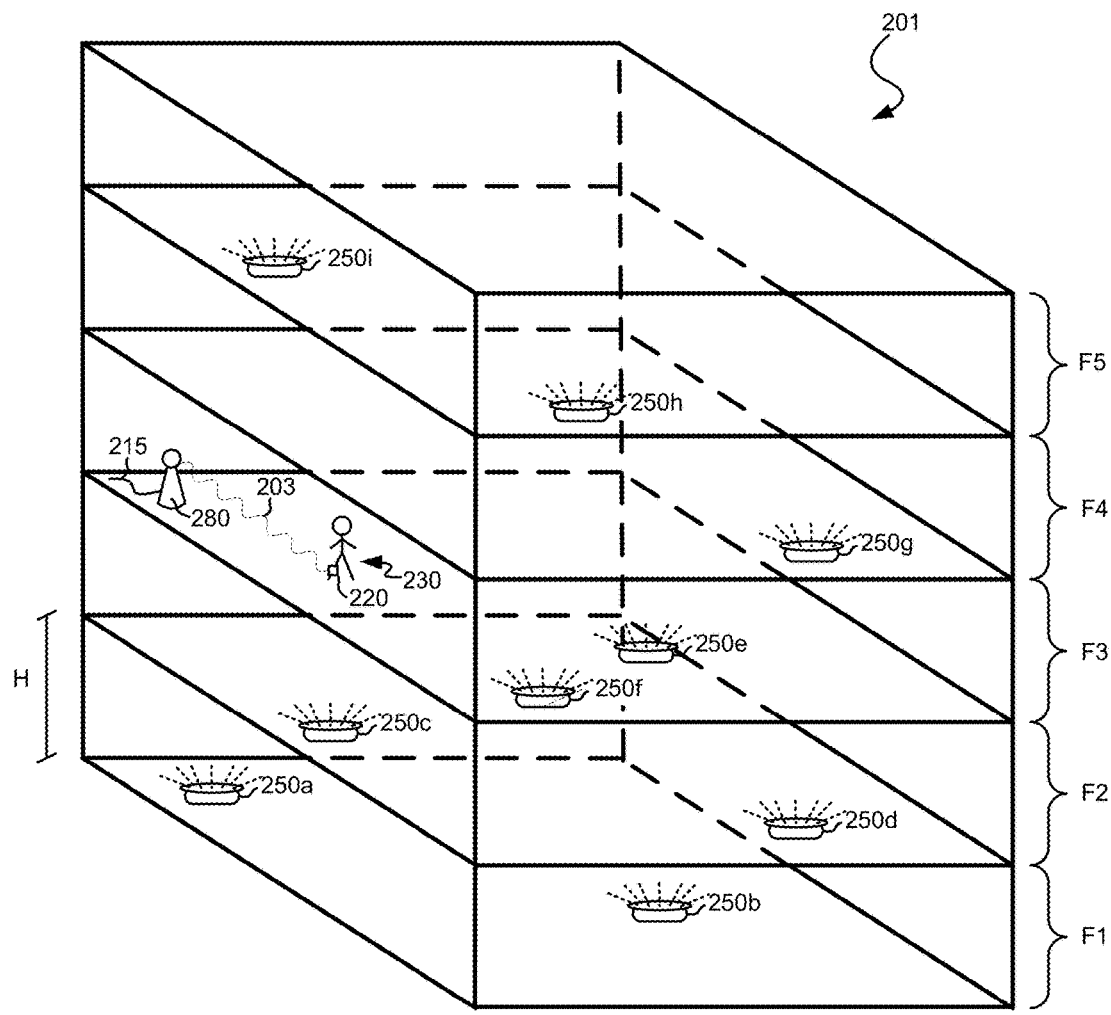
FIG. 2 shows an example deployment of an altitude sensing beacon in a multi-level building in accordance with some embodiments of the present inventions.

Turning to FIG. 2, an example deployment of an altitude sensing beacon 280 in a multi-level building 201 is shown in accordance with some embodiments of the present inventions. As shown, multi-level building 201 includes five floors (i.e., F1, F2, F3, F4, F5) each of a height (H). A number of Wi-Fi access points 250 are operating within multi-level building 201. In particular, on the first floor (F1) Wi-Fi access point 250a and Wi-Fi access point 250b are operating; on the second floor (F2) Wi-Fi access point 250c and Wi-Fi access point 250d are operating; on the third floor (F3) Wi-Fi access point 250e and Wi-Fi access point 250f are operating; on the fourth floor (F4) Wi-Fi access point 250g is operating; and on the fifth floor (F1) Wi-Fi access point 250h and Wi-Fi access point 250i are operating.

An altitude sensing beacon 280 is deployed on the first floor (F3) and attached to a power source via an active tether (e.g., a power cord) 215. Altitude sensing beacon 280 wirelessly transmits beacon information 203 as indicated by a wavy line. A human subject 230 on the third floor (F3) has a target monitor 220 attached. Target monitor 220 receives beacon information 203 as well as beacon broadcast from one or more of Wi-Fi access points 250 within range of target monitor 220.

Because each of the floors of building 201 may be separated by concrete or other building materials that interfere with wireless communications, it may be that target monitor 220 will receive signals from Wi-Fi access points 250 on the same floor, and where Wi-Fi access points 250 on other floors are received the signal will be somewhat attenuated. Similarly, the greater the distance from human subject 230 from a given Wi-Fi access point, the more signal attenuation occurs. Thus, depending upon the original strength of signals, it may be more likely that target monitor 220 will sense a greater signal strength from a closer Wi-Fi access point. In some cases, target monitor 220 will order sensed Wi-Fi access points based upon signal strength. Thus, as human subject 230 moves around on the third floor (F3) or other floors, the Wi-Fi signature sensed by target monitor 220 will change. Similarly, as altitude sensing beacon 280 moves around on the third floor (F3) or other floors, the Wi-Fi signature sensed by altitude sensing beacon 280 will change.

Figure 3:
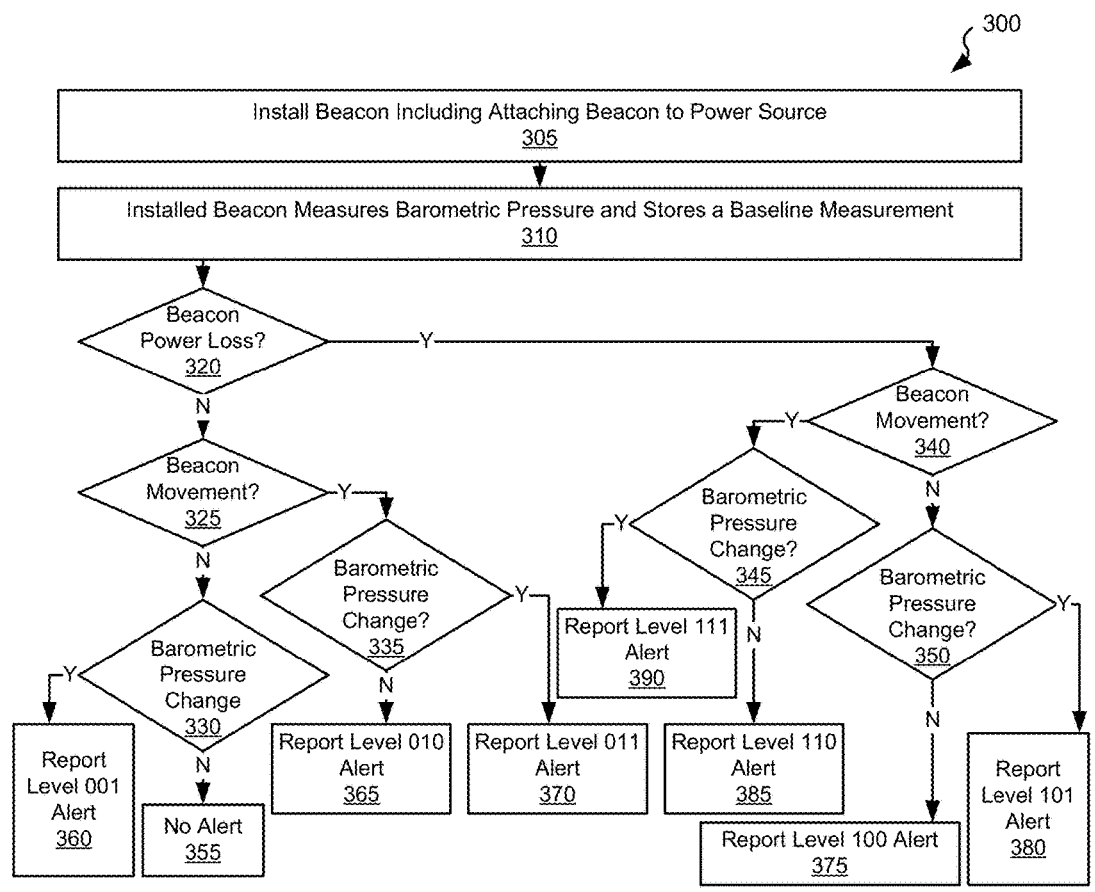
FIG. 3 is a flow diagram showing a method in accordance with some embodiments of the present inventions for beacon reliability determination.

Turning to FIG. 3, a flow diagram 300 shows a method in accordance with some embodiments of the present inventions for beacon reliability determination. Following flow diagram 300, an altitude sensing beacon is installed (block 305). In some cases, the beacon is installed by an official charged with monitoring a given human subject, and the installation includes plugging the beacon into a non-movable power source. This installation is performed at a location expected to be frequented by the human subject, and the official notes a physical location of the beacon. Once installed and upon power up, the barometric circuitry included in the beacon automatically senses an atmospheric pressure around the beacon (block 310). The sensed pressure is stored as a baseline measurement. In some cases, the barometric circuitry is a digital barometric pressure sensor which takes a reading and provides a digital output that provides an indication of the altitude of the beacon.

A number of different occurrences may indicate that the location where the beacon was originally installed has changed including, for example, loss of power, an indication from a movement sensor that the beacon has moved, or a change in the pressure information provided by the barometric circuitry. Following flow diagram 300, it is determined whether the beacon lost power (block 320). Where the beacon is disconnected from the non-movable power source, it switches to battery power. In some embodiments, a loss of power indicator (i.e., a disconnect from the non-movable power source) remains active until the beacon is again connected to a non-movable power source. In other embodiments, the loss of power indicator is stored and remains active until a defined period of time after the beacon is again connected to a non-movable power source.

Where a beacon power loss is not indicated (block 320), it is determined whether a movement indicator in the beacon indicates that the beacon has been moved (block 325). Where the beacon is moved, the movement indicator will indicate beacon movement for a defined period of time after the movement ends. Where no beacon movement is indicated (block 325), the barometric circuitry included in the beacon again senses the atmospheric pressure around the beacon and the newly sensed pressure is compared with the initial baseline measurement (block 330). Where a difference between the newly sensed pressure and the initial baseline measurement is less than a defined threshold, no barometric pressure change is indicated (block 330), and no alert is generated (block 355). In such a situation, none of the power loss, movement or pressure change indications have occurred suggesting a very high likelihood that the beacon has not been moved and still remains a reliable point for establishing the location of a human subject. In some cases, the defined threshold is selected to be less than the change that would be expected if the beacon was moved from one floor to another in a building. In some cases, the height (h) between floors of a building is expected to be greater than eight (8) feet and the defined threshold is set at a default value of eight (8) feet. Alternatively, where a difference between the newly sensed pressure and the initial baseline measurement is greater than or equal to the defined threshold, a barometric pressure change is indicated (block 330). In such a case, a Level 001 alert is reported indicating a change in barometric pressure, but no indication of either power loss or movement. Such a change in barometric pressure without an indication of movement or power loss may occur due to severe atmospheric changes around the beacon, and indicates a low probability that the beacon has been moved. As such, there is a high likelihood that the beacon remains a reliable point for establishing the location of a human subject.

Where a beacon power loss is not indicated (block 320) and a beacon movement is indicated (block 325), the barometric circuitry included in the beacon again senses the atmospheric pressure around the beacon and the newly sensed pressure is compared with the initial baseline measurement (block 335). Where a difference between the newly sensed pressure and the initial baseline measurement is less than the defined threshold, no barometric pressure change is indicated (block 335). In such a case, a Level 010 alert is reported indicating movement, but no indication of either power loss or pressure change (block 365). Such an indication of movement without an indication of power loss of barometric pressure may occur due to something falling or someone bumping into the beacon, but indicates a low probability that the beacon has been moved. As such, there is a high likelihood that the beacon remains a reliable point for establishing the location of a human subject. Alternatively, where a difference between the newly sensed pressure and the initial baseline measurement is greater than or equal to the defined threshold, no barometric pressure change is indicated (block 335). In such a case, a Level 011 alert is reported indicating movement and a changed in pressure, but no indication of power loss (block 370). Such an indication of movement and pressure change without an indication of power loss may be due to a combination of someone bumping into the beacon and significant changes in atmospheric conditions, but indicates a higher probability (i.e., higher than the Level 010 alert) that the beacon has been moved. As such, there is now some likelihood that the beacon is no longer a reliable point for establishing the location of a human subject.

Where a beacon power loss is indicated (block 320) and a beacon movement is indicated (block 340), the barometric circuitry included in the beacon again senses the atmospheric pressure around the beacon and the newly sensed pressure is compared with the initial baseline measurement (block 345). Where a difference between the newly sensed pressure and the initial baseline measurement is less than the defined threshold, no barometric pressure change is indicated (block 345). In such a case, a Level 110 alert is reported indicating movement and power loss, but no pressure change (block 385). Such an indication of movement and power loss without an indications of pressure change may be due to conditions after which the beacon still remains a reliable point for establishing the location of a human subject. However, the likelihood that the beacon is no longer a reliable point for establishing the location of a human subject is quite high. In such a scenario, it is likely that the location of the beacon has changed within the same floor of a building. Alternatively, where a difference between the newly sensed pressure and the initial baseline measurement is greater than or equal to the defined threshold, a barometric pressure change is indicated (block 345). In such a case, a Level 111 alert is reported indicating all of movement, a change in pressure, and power loss (block 390). Such an indication of movement, pressure change, and power loss may possibly be due to conditions which do not include movement of the beacon. However, the likelihood that the beacon is no longer a reliable point for establishing the location of a human subject is very high (i.e., more likely than with a Level 110 alert).

Where a beacon power loss is indicated (block 320), but no beacon movement is indicated (block 340), the barometric circuitry included in the beacon again senses the atmospheric pressure around the beacon and the newly sensed pressure is compared with the initial baseline measurement (block 350). Where a difference between the newly sensed pressure and the initial baseline measurement is less than the defined threshold, no barometric pressure change is indicated (block 350). In such a case, a Level 100 alert is reported indicating power loss, but no pressure change or movement. Such an indication of power loss without an indication of movement or pressure change may be due to a general loss of building power. In such a case, there is a high likelihood (similar to a Level 010 alert or a Level 001 alert) that the beacon remains a reliable point for establishing the location of a human subject. Alternatively, where a difference between the newly sensed pressure and the initial baseline measurement is greater than or equal to the defined threshold, a barometric pressure change is indicated (block 350). In such a case, a Level 101 alert is reported indicating a loss of power and a change in pressure, but no movement (block 380). This occurrence may be due to a sever storm that creates a significant atmospheric change resulting in a change in pressure and a general loss of power to the building. In such a case, there is a reasonably high likelihood (less than, for example, that corresponding to a Level 010 alert) that the beacon remains a reliable point for establishing the location of a human subject.

In some embodiments, the aforementioned alerts are transmitted to a central monitoring station and provided to the official charged with monitoring the human subject. The transmission may be made by a target monitor associated with the human subject. In such a case, when the target monitor comes within range of the beacon, the beacon ID and other information including the alert level is received by the target monitor. In turn, the target monitor transmits the beacon information to the central monitoring station. By providing differing degrees of alerts, the official receiving the alert may be able to prioritize the importance of visiting the location where the beacon was placed to assure that the beacon is functioning properly and is located where it was expected. Where it is found that the beacon has been purposefully moved, follow up with the human subject may be warranted.

Figure 4:
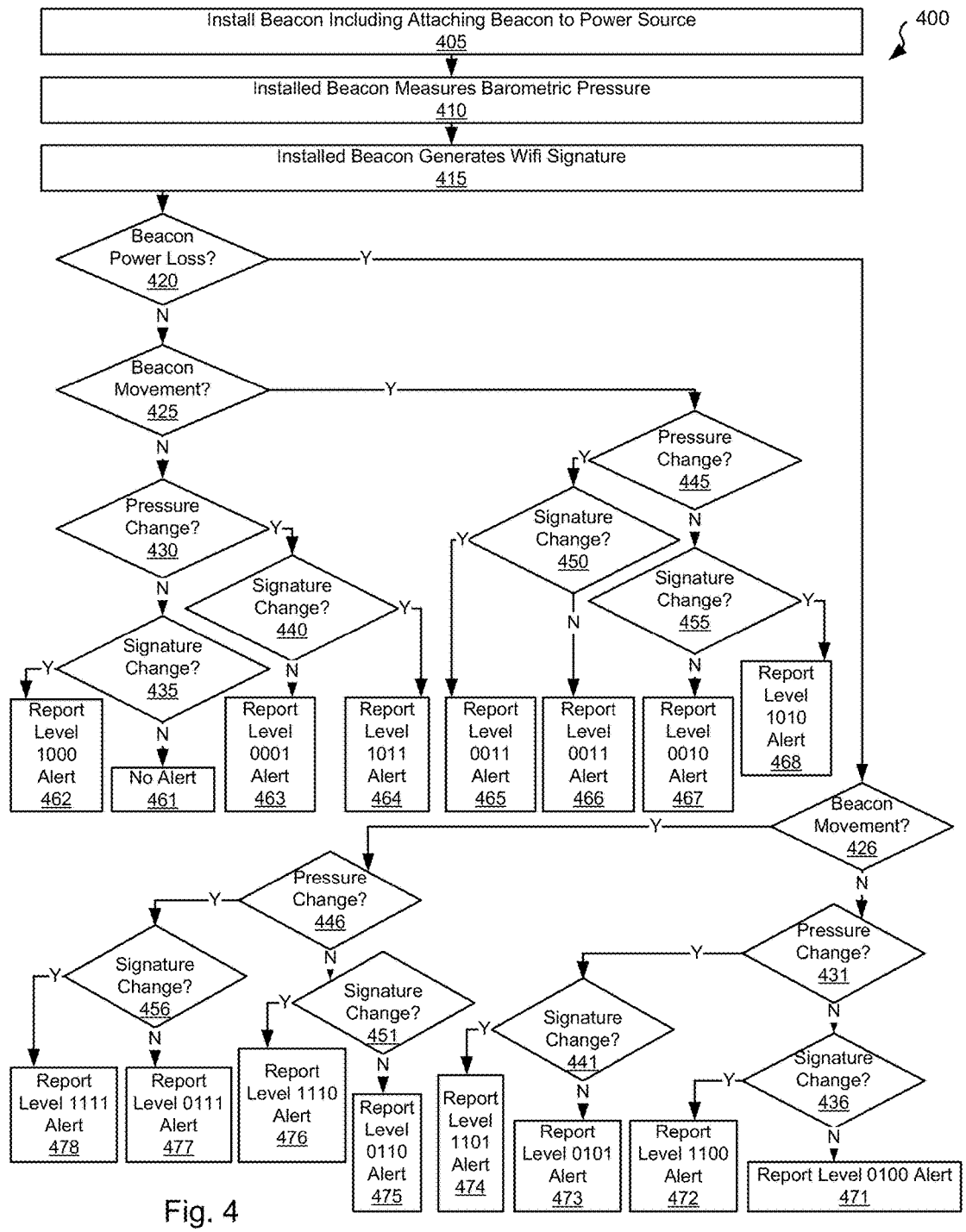
FIG. 4 is a flow diagram showing a method in accordance with various embodiments of the present inventions for beacon reliability determination.

Turning to FIG. 4, a flow diagram 400 shows a method in accordance with various embodiments of the present inventions for beacon reliability determination. Following flow diagram 400, an altitude sensing beacon is installed (block 405). In some cases, the beacon is installed by an official charged with monitoring a given human subject, and the installation includes plugging the beacon into a non-movable power source. This installation is performed at a location expected to be frequented by the human subject, and the official notes a physical location of the beacon. Once installed and upon power up, the barometric circuitry included in the beacon automatically senses an atmospheric pressure around the beacon (block 410). The sensed pressure is stored as a baseline measurement. In some cases, the barometric circuitry is a digital barometric pressure sensor which takes a reading and provides a digital output that provides an indication of the altitude of the beacon. In addition, the installed beacon generates a Wi-Fi signature which is stored as a home signature (block 415). Generating the Wi-Fi signature includes sensing one or more Wi-Fi access points within range of the beacon. The beacon then orders the sensed Wi-Fi access points based upon, for example, signal strength. This ordered set of Wi-Fi access points is stored as a home signature.

A number of different occurrences may indicate that the location where the beacon was originally installed has changed including, for example, loss of power, an indication from a movement sensor that the beacon has moved, a change in the pressure information provided by the barometric circuitry, or a change in Wi-Fi signature. Following flow diagram 400, it is determined whether the beacon lost power (block 420). Where the beacon is disconnected from the non-movable power source, it switches to battery power. In some embodiments, a loss of power indicator (i.e., a disconnect from the non-movable power source) remains active until the beacon is again connected to a non-movable power source. In other embodiments, the loss of power indicator is stored and remains active until a defined period of time after the beacon is again connected to a non-movable power source.

Where a beacon power loss is not indicated (block 420), it is determined whether a movement indicator in the beacon indicates that the beacon has been moved (block 425). Where the beacon is moved, the movement indicator will indicate beacon movement for a defined period of time after the movement ends. Where no beacon movement is indicated (block 425), the barometric circuitry included in the beacon again senses the atmospheric pressure around the beacon and the newly sensed pressure is compared with the initial baseline measurement (block 430). Where a difference between the newly sensed pressure and the initial baseline measurement is less than a defined threshold, no barometric pressure change is indicated (block 430). In some cases, the defined threshold is selected to be less than the change that would be expected if the beacon was moved from one floor to another in a building. In some cases, the height (h) between floors of a building is expected to be greater than eight (8) feet and the defined threshold is set at a default value of eight (8) feet. Where no barometric pressure change is indicated (block 430), the W-Fi signature of the beacon is re-generated and the newly generated Wi-Fi signature is compared with the home Wi-Fi signature (block 435). Where there is no change in the Wi-Fi signature (block 435), no alert is generated (block 461). In such a situation, none of the power loss, movement, pressure change or signature change indications have occurred suggesting a very high likelihood that the beacon has not been moved and still remains a reliable point for establishing the location of a human subject. Alternatively, where a change in Wi-Fi signature is indicated (block 435), a Level 1000 alert is reported indicating a change in Wi-Fi signature without a power loss, movement, or a change in pressure (block 462). Such a change in Wi-Fi signature without a power loss, movement, or a change in pressure may occur due to a power loss, reset, malfunction of a Wi-Fi access point previously included in the Wi-Fi signature, addition of a new Wi-Fi access point, or reconfiguration of a previously existing Wi-Fi access point. As such, there is a high likelihood that the beacon remains a reliable point for establishing the location of a human subject.

Where a beacon power loss is not indicated (block 420), a beacon movement is not indicated (block 425), but a pressure change is indicated (block 430), the Wi-Fi signature of the beacon is re-generated and the newly generated Wi-Fi signature is compared with the home Wi-Fi signature (block 440). Where there is no change in the Wi-Fi signature (block 440), a Level 0001 alert is reported indicating a change in pressure without a power loss, movement, or a change in Wi-Fi Signature (block 463). Such a change in pressure without a power loss, movement, or a change in Wi-Fi signature may occur due to severe atmospheric changes around the beacon, and indicates a low probability that the beacon has been moved. As such, there is a high likelihood that the beacon remains a reliable point for establishing the location of a human subject. Alternatively, where there is a change in the Wi-Fi signature (block 440), a Level 1001 alert is reported indicating a change in pressure and Wi-Fi signature without a power loss or movement (block 464). Such a change in Wi-Fi signature and pressure without a power loss or movement may occur due to severe atmospheric changes around the beacon and a loss in a Wi-Fi access point previously included in the Wi-Fi Signature, and indicates a low probability that the beacon has been moved. As such, there is a high likelihood that the beacon remains a reliable point for establishing the location of a human subject.

Where a beacon power loss is not indicated (block 420), a beacon movement is indicated (block 425), and a pressure change is indicated (block 445), the W-Fi signature of the beacon is re-generated and the newly generated Wi-Fi signature is compared with the home Wi-Fi signature (block 450). Where there is no change in the Wi-Fi signature (block 450), a Level 0011 alert is reported indicating a change in pressure and beacon movement without a power loss or a change in Wi-Fi Signature (block 466). Such a change in pressure and beacon movement without a power loss or a change in Wi-Fi signature may occur due to severe atmospheric changes around the beacon and some insignificant movement of the beacon, and indicates a low probability that the beacon has been moved. As such, there is a high likelihood that the beacon remains a reliable point for establishing the location of a human subject. Alternatively, where there is a change in the Wi-Fi signature (block 450), a Level 1011 alert is reported indicating movement, a change in pressure and Wi-Fi signature without a power loss (block 465). Such a combination of movement, a change Wi-Fi signature and pressure without a power loss likely indicates improper movement of the beacon from its original location coupled with a failure of the power loss indication circuit. As such, there is a low likelihood that the beacon remains a reliable point for establishing the location of a human subject.

Where a beacon power loss is not indicated (block 420), a beacon movement is indicated (block 425), and a pressure change is not indicated (block 445), the W-Fi signature of the beacon is re-generated and the newly generated Wi-Fi signature is compared with the home Wi-Fi signature (block 455). Where there is no change in the Wi-Fi signature (block 455), a Level 0010 alert is reported indicating movement, but no power loss, or change in either pressure or Wi-Fi signature (block 467). Such an indication of movement without an indication of power loss or either change in pressure or Wi-Fi signature may occur due to something falling or someone bumping into the beacon, and indicates a low probability that the beacon has been moved. As such, there is a high likelihood that the beacon remains a reliable point for establishing the location of a human subject. Alternatively, where there is a change in the Wi-Fi signature (block 455), a Level 1010 alert is reported indicating movement, a change in pressure and Wi-Fi signature without a power loss (block 468). Such a combination of movement and a change in Wi-Fi signature without a power loss or change in pressure possibly indicates improper movement of the beacon from its original location within the same floor which is coupled with a failure of the power loss indication circuit. As such, there is a low likelihood that the beacon remains a reliable point for establishing the location of a human subject.

Where a beacon power loss is indicated (block 420), a beacon movement is not indicated (block 426), a pressure change is not indicated (block 431), and a Wi-Fi signature change is not indicated (block 436), a Level 0100 alert is reported indicating power loss, but no Wi-Fi signature change, pressure change or movement (block 471). Such an indication of power loss without an indication of movement, pressure change or Wi-Fi signature change may be due to a general loss of building power. In such a case, there is a high likelihood (similar to a Level 0010 alert) that the beacon remains a reliable point for establishing the location of a human subject. Alternatively, where a Wi-Fi signature change is indicated (block 436), a Level 1100 alert is reported indicating power loss and Wi-Fi signature change, but no pressure change or movement (block 472). Such an indication of power loss and Wi-Fi signature change without an indication of movement or pressure change may be due to a general loss of building power. In such a case, there is a high likelihood (similar to a Level 0100 alert) that the beacon remains a reliable point for establishing the location of a human subject.

Where a beacon power loss is indicated (block 420), a beacon movement is not indicated (block 426), a pressure change is indicated (block 431), and a Wi-Fi signature change is not indicated (block 441), a Level 0101 alert is reported indicating power loss and pressure change, but no Wi-Fi signature change or movement (block 473). Such an indication of power loss and pressure change without an indication of movement or Wi-Fi signature change may be due to a storm that causes general loss of building power. In such a case, there is a high likelihood (similar to a Level 0010 alert) that the beacon remains a reliable point for establishing the location of a human subject. Alternatively, where a Wi-Fi signature change is indicated (block 441), a Level 1101 alert is reported indicating power loss, pressure change, and Wi-Fi signature change, but no movement (block 474). Such an indication of power loss, pressure change and Wi-Fi signature change without an indication of movement may indicate improper movement of the beacon coupled with a malfunction of the beacon's movement sensing circuitry. In such a case, there is a low likelihood that the beacon remains a reliable point for establishing the location of a human subject.

Where a beacon power loss is indicated (block 420), a beacon movement is indicated (block 426), a pressure change is not indicated (block 446), and a Wi-Fi signature change is not indicated (block 451), a Level 0110 alert is reported indicating power loss and movement without a pressure change or change in the Wi-Fi signature (block 475). Such an indication of power loss and movement without a pressure change or change in the Wi-Fi signature is somewhat likely to indicate improper movement of the beacon within the same floor of the building. In such a case, there is a lower likelihood that the beacon remains a reliable point for establishing the location of a human subject. Alternatively, where a Wi-Fi signature change is indicated (block 451), a Level 1110 alert is reported indicating power loss, movement and a change in Wi-Fi signature without a pressure change is increasingly likely to indicate improper movement of the beacon within the same floor of the building (block 476). In such a case, there is a very low likelihood that the beacon remains a reliable point for establishing the location of a human subject.

Where a beacon power loss is indicated (block 420), a beacon movement is indicated (block 426), a pressure change is indicated (block 446), and a Wi-Fi signature change is not indicated (block 456), a Level 0111 alert is reported indicating power loss, movement, and pressure change without a change in the Wi-Fi signature (block 477). Such an indication of power loss, movement, and pressure change without a change in the Wi-Fi signature is somewhat likely to indicate improper movement of the beacon outside the same floor of the building with a failure or other limitation of the Wi-Fi signature circuitry being exposed. In such a case, there is a low likelihood that the beacon remains a reliable point for establishing the location of a human subject. Alternatively, where a Wi-Fi signature change is indicated (block 456), a Level 1111 alert is reported indicating power loss, movement, a pressure change, and a change in Wi-Fi signature (block 478). In such a case, there is almost a certainty that the beacon does not remain a reliable point for establishing the location of a human subject.

In some embodiments, the aforementioned alerts are transmitted to a central monitoring station and provided to the official charged with monitoring the human subject. The transmission may be made by a target monitor associated with the human subject. In such a case, when the target monitor comes within range of the beacon, the beacon ID and other information including the alert level is received by the target monitor. In turn, the target monitor transmits the beacon information to the central monitoring station. By providing differing degrees of alerts, the official receiving the alert may be able to prioritize the importance of visiting the location where the beacon was placed to assure that the beacon is functioning properly and is located where it was expected. Where it is found that the beacon has been purposefully moved, follow up with the human subject may be warranted.

Figure 5:
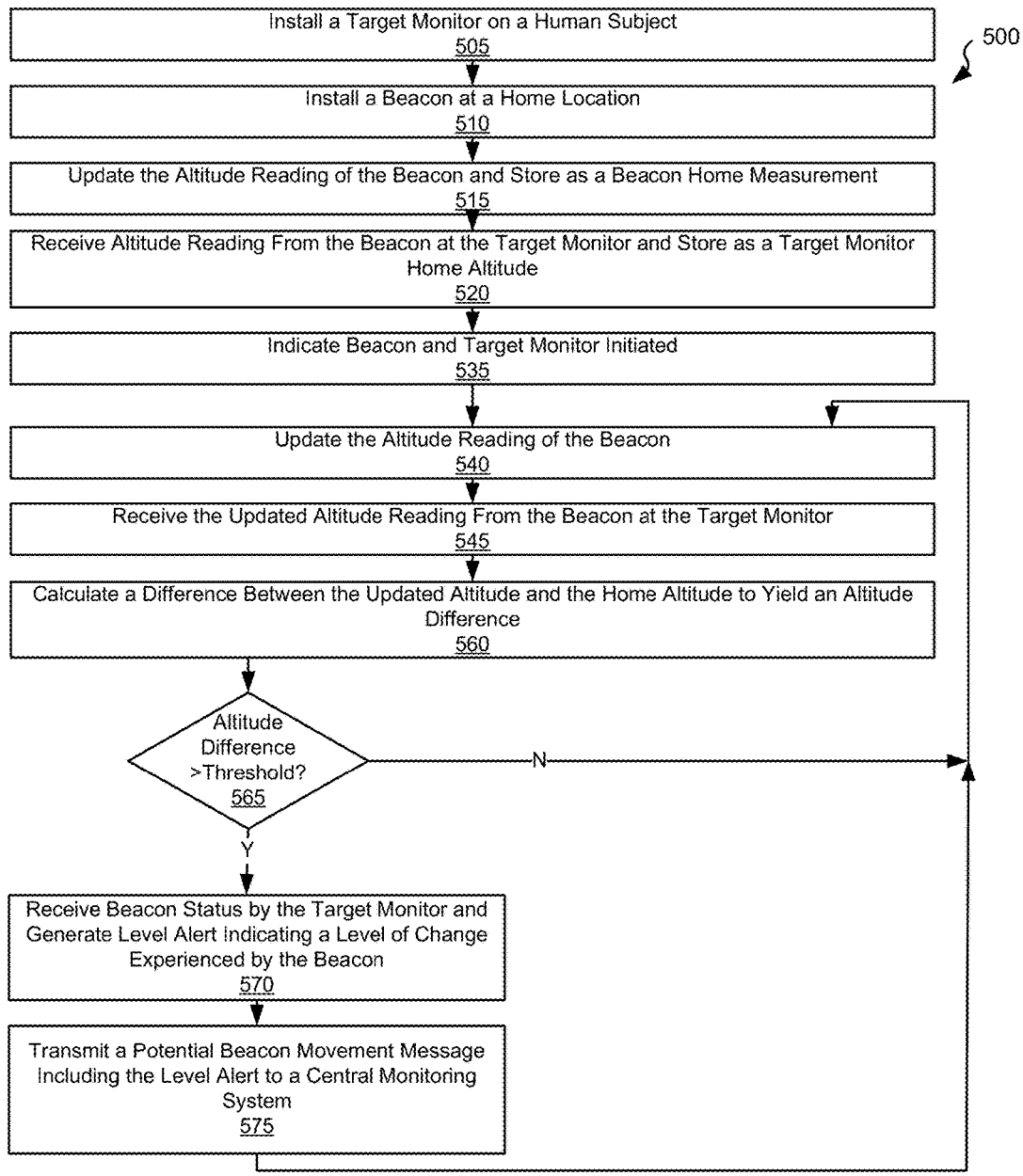
FIG. 5 is a flow diagram showing a method for altitude based location and veracity determination in accordance with some embodiments of the present inventions.

Turning to FIG. 5, a flow diagram 500 shows a method for altitude based location and veracity determination in accordance with some embodiments of the present inventions. Following flow diagram 500, a target monitor is installed on a human subject (block 505). In some cases, this is done by an official charged with monitoring a given human subject, and the installation includes securely fastening the target monitor around a limb of the human subject and assuring it is operating correctly. In addition, an altitude sensing beacon is installed (block 510). In some cases, the beacon is installed by the official charged with monitoring a given human subject, and the installation includes plugging the beacon into a non-movable power source. This installation is performed at a location expected to be frequented by the human subject, and the official notes a physical location of the beacon. Once installed and upon power up, the barometric circuitry included in the beacon automatically senses an atmospheric pressure around the beacon (block 515). The sensed pressure is stored as a beacon baseline measurement. In some cases, the barometric circuitry is a digital barometric pressure sensor which takes a reading and provides a digital output that provides an indication of the altitude of the beacon.

The beacon baseline measurement is transmitted as part of beacon operation and as the target monitor is brought into range of the beacon, the altitude reading from the beacon (i.e., the beacon baseline measurement) is received by the target monitor (block 520). This received information is stored as a target monitor home altitude. At this juncture, both the beacon and the target monitor have been initiated and are prepared for standard operation which is indicated (block 535). This initiated condition may be noted by, for example, a light on both the beacon and target monitor. Based upon the disclosure provided herein, one of ordinary skill in the art will recognize other approaches that may be used to indicate initiation.

In operation, the altitude reading of the beacon is updated (block 540). Such updating involves the barometric circuitry included in the beacon re-sensing the atmospheric pressure around the beacon and storing the result as the beacon baseline measurement. This beacon baseline measurement is transmitted by the beacon and as the target monitor is brought into range of the beacon, the updated altitude reading from the beacon (i.e., the beacon baseline measurement) is received by the target monitor (block 545). The target monitor calculates a difference between the newly received altitude reading and the target monitor home altitude stored during initiation (block 560). This difference is an altitude difference.

It is determined whether the altitude difference is greater than a defined threshold (block 565). In some cases, the height (h) between floors of a building is expected to be greater than eight (8) feet and the defined threshold is set at a default value of eight (8) feet. Where the altitude difference is greater than the defined threshold (block 565), additional beacon status is stored by the target monitor (block 570). This additional beacon status may include, but is not limited to, a beacon movement indicator, a Wi-Fi signature change indicator, and/or a power loss indicator. Based upon this stored status information an alert level indicator similar to those discussed in relation to FIGS. 3 and 4 is generated. A potential beacon movement message including the level alert is sent to the central monitoring system (block 575). The processes of blocks 540-575 are continuously repeated as the system operates. It should be noted that in other embodiments that the raw status information from the beacon and the indication of a change in altitude is transmitted to the central monitoring station.

Figure 6:
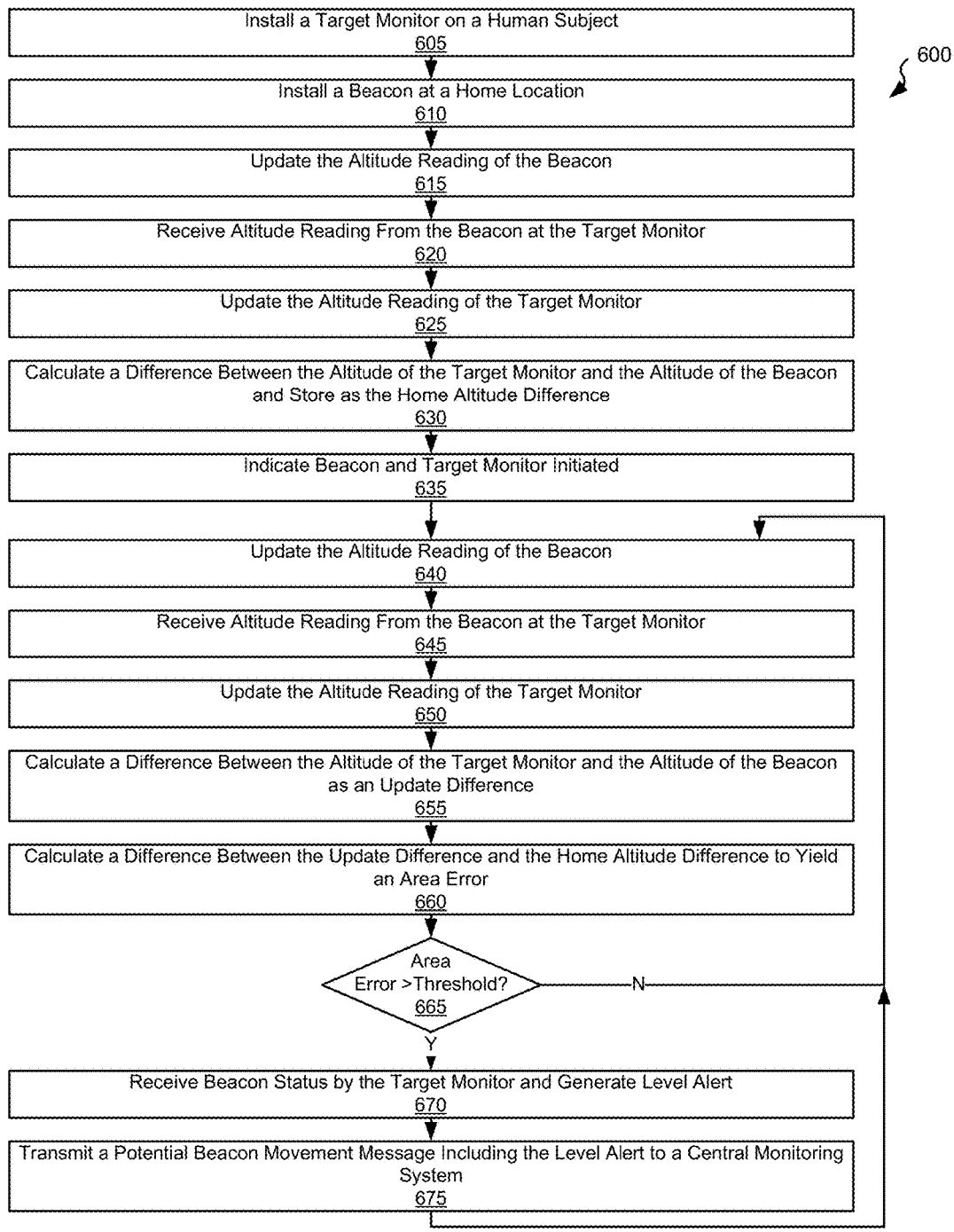
FIG. 6 is a flow diagram showing a method for altitude based location and veracity determination in accordance with other embodiments of the present inventions.

Turning to FIG. 6, a flow diagram 600 shows a method for altitude based location and veracity determination in accordance with some embodiments of the present inventions. Following flow diagram 600, a target monitor is installed on a human subject (block 605). In some cases, this is done by an official charged with monitoring a given human subject, and the installation includes securely fastening the target monitor around a limb of the human subject and assuring it is operating correctly. In addition, an altitude sensing beacon is installed (block 610). In some cases, the beacon is installed by the official charged with monitoring a given human subject, and the installation includes plugging the beacon into a non-movable power source. This installation is performed at a location expected to be frequented by the human subject, and the official notes a physical location of the beacon. Once installed and upon power up, the barometric circuitry included in the beacon automatically senses an atmospheric pressure around the beacon (block 615). In some cases, the barometric circuitry is a digital barometric pressure sensor which takes a reading and provides a digital output that provides an indication of the altitude of the beacon.

The altitude information is transmitted as part of beacon operation and as the target monitor is brought into range of the beacon, the altitude reading from the beacon (i.e., the beacon baseline measurement) is received by the target monitor (block 620). In addition, the barometric circuitry included in the target monitor automatically senses an atmospheric pressure around the target monitor and updates the altitude reading of the target monitor (block 625). In some cases, the barometric circuitry in the target monitor is implemented using the same circuitry as the barometric circuitry in the beacon. A difference is calculated between the altitude of the target monitor and the altitude of the beacon, and the difference is stored as a home altitude difference (block 630). At this juncture, both the beacon and the target monitor have been initiated and are prepared for standard operation which is indicated (block 635). This initiated condition may be noted by, for example, a light on both the beacon and target monitor. Based upon the disclosure provided herein, one of ordinary skill in the art will recognize other approaches that may be used to indicate initiation.

In operation, the altitude reading of the beacon is updated (block 640). Such updating involves the barometric circuitry included in the beacon re-sensing the atmospheric pressure around the beacon and storing the result as the beacon baseline measurement. This altitude information is transmitted by the beacon and as the target monitor is brought into range of the beacon, the updated altitude reading from the beacon is received by the target monitor (block 645). The altitude reading of the target monitor is also updated (block 650). Such updating involves the barometric circuitry included in the target monitor re-sensing the atmospheric pressure around the target monitor and storing the result.

A difference is calculated between the updated altitude of the target monitor and the updated altitude of the beacon, and the difference is stored as an update difference (block 655). A difference is then calculated between the update difference and the home altitude difference to yield an area error (block 660). It is then determined whether the magnitude of the area error is greater than an error threshold (block 665). In some cases, the height (h) between floors of a building is expected to be greater than eight (8) feet and the area threshold is set at a default value of eight (8) feet. Where the area error is greater than the area threshold (block 665), additional beacon status is stored by the target monitor (block 670). This additional beacon status may include, but is not limited to, a beacon movement indicator, a Wi-Fi signature change indicator, and/or a power loss indicator. Based upon this stored status information an alert level indicator similar to those discussed in relation to FIGS. 3 and 4 is generated. A potential beacon movement message including the level alert is sent to the central monitoring system (block 675). The processes of blocks 640-575 are continuously repeated as the system operates. It should be noted that in other embodiments that the raw status information from the beacon and the indication of a change in altitude is transmitted to the central monitoring station.

In some embodiments, the aforementioned alerts are transmitted to a central monitoring station and provided to the official charged with monitoring the human subject. The transmission may be made by a target monitor associated with the human subject. In such a case, when the target monitor comes within range of the beacon, the beacon ID and other information including the alert level is received by the target monitor. In turn, the target monitor transmits the beacon information to the central monitoring station. By providing differing degrees of alerts, the official receiving the alert may be able to prioritize the importance of visiting the location where the beacon was placed to assure that the beacon is functioning properly and is located where it was expected. Where it is found that the beacon has been purposefully moved, follow up with the human subject may be warranted.

In conclusion, the present invention provides for novel systems, devices, and methods for monitoring human subjects using location information provided from tethered beacons. While detailed descriptions of one or more embodiments of the invention have been given above, various alternatives, modifications, and equivalents will be apparent to those skilled in the art without varying from the spirit of the inventions. Therefore, the above description should not be taken as limiting the scope of the invention, which is defined by the appended claims.

What is claimed is:

1. A location monitoring system, the system comprising:
   a beacon device including:
      an altitude determination circuit operable to determine an altitude value corresponding to an altitude of the beacon device;
      a wireless transmitter circuit operable to transmit beacon information including beacon location data derived from the altitude value;
   a target monitor including:
      an attachment apparatus configured to attach the target monitor to a target wherein the attachment apparatus is a strap operable to wrap around a portion of the target, and wherein the strap includes tamper detection capability;
      a wireless receiver circuit operable to receive the beacon information; and
      a wireless transmitter circuit operable to transmit an alert level to a recipient device, wherein the alert level is generated based at least in part on the beacon location data, and wherein the recipient device is separate from the target.

2. The monitoring system of claim 1, wherein the altitude determination circuit is a barometric pressure sensing circuit, and wherein the altitude value is an indication of a barometric pressure around the beacon device.

3. The monitoring system of claim 1, wherein the altitude value is a first altitude value corresponding to a first time, wherein the altitude determination circuit is further operable to determine a second altitude value corresponding to an altitude of the beacon device at a second time, and wherein beacon device further comprises:
   a controller circuit operable to:

compare the first altitude value with the second altitude value;
generate an altitude change indication when a difference between the first altitude value and the second altitude value is greater than a threshold value; and
wherein the altitude change indication is included in the beacon location data, and wherein the alert level is generated based at least in part on the altitude change indication.

4. The monitoring system of claim 1, wherein the beacon location data includes the altitude value, and wherein target monitor further comprises:
a controller circuit operable to:
store the altitude value at a first time as a baseline value in a memory;
receive the altitude value at a second time as an updated value;
compare the updated value with the baseline value; and
generate the alert level based at least in part on the result of the comparison of the updated value with the baseline value.

5. The monitoring system of claim 4, wherein the alert level indicates a change in altitude of the beacon device when the magnitude of a difference between the updated value and the baseline value exceeds a threshold value.

6. The monitoring system of claim 1, wherein the target monitor further comprises:
an altitude determination circuit.

7. The monitoring system of claim 1, wherein the beacon device further comprises:
a power loss indication circuit operable to generate a power loss indication when the beacon device stops receiving power from a fixed power source.

8. The monitoring system of claim 7, wherein the beacon device further comprises:
a motion sensing circuit operable to generate a motion indication when the beacon device moves.

9. The monitoring system of claim 8, wherein the beacon information further includes the motion indication and the power loss indication, and wherein the alert level is generated based at least in part on a combination of the beacon location data, the motion indication, and the power loss indication.

10. The monitoring system of claim 8, wherein the beacon device further comprises:
a Wi-Fi signature circuit operable to detect a change in Wi-Fi access points visible to the beacon device and to generate a Wi-Fi signature change indication, wherein the beacon information further includes the Wi-Fi signature change indication; and
wherein the alert level is generated based at least in part on a combination of the beacon location data, the motion indication, the power loss indication, and the Wi-Fi signature change indication.

11. The monitoring system of claim 8, wherein the target monitor device further comprises:
a Wi-Fi signature circuit operable to detect a change in Wi-Fi access points visible to the target monitor when the target monitor is in range of the beacon device and to generate a Wi-Fi signature change indication; and
wherein the alert level is generated based at least in part on a combination of the beacon location data, the motion indication, the power loss indication, and the Wi-Fi signature change indication.

12. The monitoring system of claim 1, wherein the alert level indicates a likelihood that the beacon device was moved from a baseline position.

13. A beacon device, the beacon device comprising:
a beacon identification value associated with a physical location of the beacon device;
an altitude determination circuit operable to determine an altitude value corresponding to an altitude of the beacon device;
a wireless transmitter circuit operable to transmit the beacon identification value and an altitude data derived from the altitude value; and
wherein the wireless transmitter circuit is further operable to transmit a motion indication indicating motion of the beacon and a power loss indication indicating disconnection of the beacon from a fixed power source, and wherein an alert level is generated based at least in part on a combination of the beacon altitude data, the motion indication, and the power loss indication.

14. The beacon device of claim 13, wherein the altitude determination circuit is a barometric pressure sensing circuit, and wherein the altitude value is an indication of a barometric pressure around the beacon device.

15. The beacon device of claim 13, wherein the beacon device further comprises:
a power loss indication circuit operable to generate a power loss indication when the beacon device stops receiving power via the fixed power source connection; and
wherein the wireless transmitter circuit is further operable to transmit the power loss indication.

16. The beacon device of claim 13, wherein the beacon device further comprises:
a motion sensing circuit operable to generate a motion indication when the beacon device moves; and
wherein the wireless transmitter circuit is further operable to transmit the motion indication.

17. The beacon device of claim 13, wherein the beacon device further comprises:
a Wi-Fi signature circuit operable to detect a change in Wi-Fi access points visible to the beacon device and to generate a Wi-Fi signature change indication.

18. The beacon device of claim 13, wherein the beacon device further comprises:
a Wi-Fi signature circuit operable to detect a change in Wi-Fi access points visible to the beacon device and to generate a Wi-Fi signature change indication, wherein the wireless transmitter circuit is further operable to transmit the Wi-Fi signature change indication; and
wherein the alert level is generated based at least in part on a combination of the beacon location data, the motion indication, the power loss indication, and the Wi-Fi signature change indication.

19. The beacon device of claim 13, wherein the target monitor device further comprises:
a Wi-Fi signature circuit operable to detect a change in Wi-Fi access points visible to the target monitor when the target monitor is in range of the beacon device and to generate a Wi-Fi signature change indication; and
wherein the alert level is generated based at least in part on a combination of the beacon location data, the motion indication, the power loss indication, and the Wi-Fi signature change indication.

20. A location monitoring system, the system comprising:
a beacon device including:
an altitude determination circuit operable to determine an altitude value corresponding to an altitude of the beacon device;
a wireless transmitter circuit operable to transmit beacon information including the altitude value;

a target monitor including:
- an attachment apparatus configured to attach the target monitor to a target;
- a wireless receiver circuit operable to receive the beacon information;
- a wireless transmitter circuit operable to transmit an alert level to a recipient device, wherein the alert level is generated based at least in part on the beacon information, and wherein the recipient device is separate from the target; and
- a controller circuit operable to:
  - store the altitude value at a first time as a baseline value in a memory;
  - receive the altitude value at a second time as an updated value;
  - compare the updated value with the baseline value; and
  - generate the alert level based at least in part on the result of the comparison of the updated value with the baseline value.

21. The system of claim 20, wherein the alert level indicates a change in altitude of the beacon device when the magnitude of a difference between the updated value and the baseline value exceeds a threshold value.

22. The system of claim 20, wherein the altitude value is a first altitude value corresponding to a first time, wherein the altitude determination circuit is further operable to determine a second altitude value corresponding to an altitude of the beacon device at a second time, and wherein the controller circuit is further operable to:
- compare the first altitude value with the second altitude value;
- generate an altitude change indication when a difference between the first altitude value and the second altitude value is greater than a threshold value; and
- wherein the altitude change indication is included in the beacon location data, and wherein the alert level is generated based at least in part on the altitude change indication.

* * * * *